May 22, 1934.                H. D. MARSHALL                1,959,485
                         PRESERVATION OF RAW CHEESE
                             Filed May 3, 1933
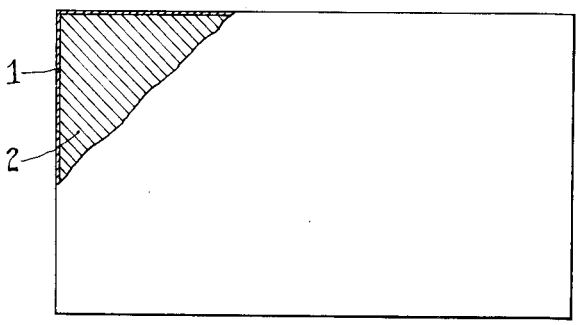
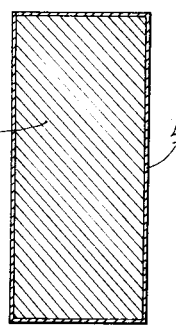
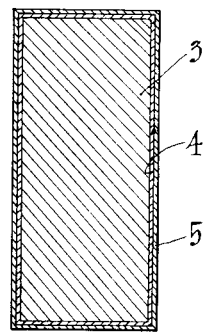
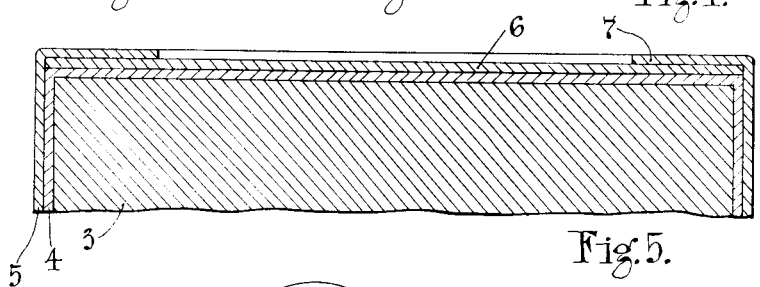
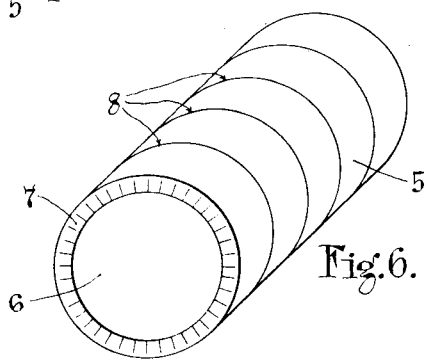
INVENTOR:
HAROLD D. MARSHALL.
BY                                      ATTORNEYS.

Patented May 22, 1934

1,959,485

UNITED STATES PATENT OFFICE 1,959,485

PRESERVATION OF RAW CHEESE

Harold D. Marshall, Ottawa, Ontario, Canada

Application May 3, 1933, Serial No. 669,257
In Canada August 18, 1932

6 Claims. (Cl. 99—8)

This invention relates to the preservation of raw cheese and is particularly applicable to the preservation of sectional portions of whole raw cheeses of the Cheddar and like types which are normally manufactured in large sizes unsuited to retail sale until cut into relatively small portions.

In the manufacture of, for example, Cheddar cheese the curd is pressed into cheese-cloth lined molds of such a size as to produce cheeses weighing substantially 80 pounds. The cheese-cloth acts as a binder but leaves the surface of the curd exposed to the atmosphere and as a result of evaporation a hard tough rind is formed on the outside which effectually seals and preserves the cheese within.

Raw cheeses so produced if handled with reasonable care and with the rind unbroken, can be kept for a year or more without deterioration or change other than the usual and desirable change in texture due to the maturing of the cheese.

Such cheeses with a naturally formed protective rind thereon can however, only be produced economically in large sizes while the consumer demand is for small pieces or units.

If the large cheeses are cut into the small units suited to retail sale such units having large exposed surfaces unprotected by rind are quickly spoiled due to evaporation, separation and exudation of butter fat, formation of mould and other deteriorating influences.

While it has been possible to produce from pasteurized or processed cheese and deliver ready packaged to the retailer small units of good keeping character such as are attractive to and desired by the public it has not hitherto been possible to provide similar units of raw cheese owing to the difficulty of preventing rapid deterioration thereof.

Objects of the present invention are to overcome this difficulty by providing a simple and effective method of preserving from deterioration units of raw cheese devoid of natural rind and to make available to the consuming public raw cheese in units of convenient size and shape and of good keeping character.

Further objects are to employ in the preservation of units of raw cheese edible material and to provide for the maintenance of the preservative material in edible condition.

With these objects in view the invention consists primarily in applying to the exposed surface of the raw cheese devoid of rind an edible material adapted to adhere to the exposed surface in a thin layer or coating and capable of preventing the exudation and accumulation of a film of separated butter fat between the surface of the raw cheese and the adherent layer. The invention also comprises the further features hereinafter described and more particularly pointed out in the appended claims.

In the accompanying drawing which illustrates one manner of carrying the invention into effect—

Figure 1 is an elevation of a cheese partly in section.

Figure 2 is an elevation of a unit of raw cheese.

Figures 3 and 4 are cross sections of a unit illustrating stages in its preparation.

Figure 5 is an enlarged sectional elevation of one end of a completed unit.

Figure 6 is a perspective view of a completed unit.

In carrying the invention into effect in one convenient manner as applied to the preparation of units of raw Cheddar cheese of suitable size, shape and keeping character for retail sale, the natural rind 1 is removed from the whole Cheddar cheese as commercially manufactured and the internal portion 2 is divided into units 3 which may conveniently be circular in cross section and weigh one-half pound or one pound.

Each unit 3 is then momentarily immersed in a bath of pasteurized skim milk cheese preferably at pasteurizing temperature and of sufficient liquidity that only a thin layer or coating 4 adheres to the unit 3 when it is withdrawn from the bath.

After withdrawal of the unit 3 from the bath and while the adherent layer or coating 4 of pasteurized cheese is still hot and viscid, a sheet 5 of substantially impervious wrapping material, preferably a metal foil, is applied thereto and rolled around the cylindrical surface into intimate contact therewith. A disc 6 of the wrapping material is applied to each end of the cylinder and the ends 7 of the sheet 5 which project beyond the ends of the cylinder are folded down as shown in Figures 5 and 6 over the discs 6 to enclose the unit completely.

Immersion of the unit of raw cheese in the bath at pasteurizing temperature sterilizes the surface which is thereafter protected from deteriorating influences by the adherent layer or coating of pasteurized cheese, and this layer also prevents the exudation and accumulation of a film of separated butter fat between the surface of the raw cheese and the adherent layer.

The prevention of exudation and the accumuapplication of the adherent layer so acting upon the raw cheese that separation of butter fat does not subsequently occur or because any butter fat separated from the raw cheese is absorbed by the adherent layer or coating.

The covering of foil or the like protects the layer or coating of pasteurized cheese from dirt and deteriorating influences and maintains it in edible condition.

While skim milk cheese is preferably employed as the material from which the preservative layer or coating 4 is formed as it has been found highly effective possibly because, due to its lack of fat, it is particularly highly absorptive of any butter fat which may separate from the surface of the raw cheese unit, nevertheless the invention is not confined to the use of skim milk cheese for this purpose as the invention contemplates the use of any edible material capable of preventing the exudation and accumulation of a film of butter fat on the surface of the raw cheese and adapted to be applied to the raw cheese in a thin adherent layer or coating. Whole milk cheese and casein are examples of other materials that may be employed.

In place of units of small weight suitable for sale to the consumer without further subdivision, larger units of several pounds weight may be produced from which slices of the weight desired by the purchaser may be cut by the retailer. In the case of such larger units the outer covering of foil or the like may be indented or marked at intervals as shown at 8 in Figure 6 to indicate where cuts should be made to sever portions of predetermined weight.

It will be seen that the invention provides a method of effectively preserving for a relatively long period raw cheese devoid of rind and enables units of raw cheese to be produced of size, shape and keeping character desirable to the consuming public.

The invention is not confined to any particular raw cheese or size or shape of unit nor to any specific materials for the preservative layer or coating and for the wrapper, as these features may be varied or changed as desired within the scope of the appended claims.

What I claim is:—

1. A method of preserving a unit of raw cheese devoid of rind which comprise immersing the unit in a bath of melted skim milk cheese withdrawing it therefrom with a thin adherent layer or coating of the skim milk cheese and applying to the adherent layer while still viscid a wrapping of metal foil.

2. A method as claimed in claim 1 wherein the bath of melted skim milk cheese is maintained at pasteurizing temperature.

3. A method of providing sectional units of Cheddar and like cheese of the desired shape, size and keeping character for retail sale which comprises removing the rind from the cheese as manufactured, dividing the cheese into units of the desired shape and size, immersing each unit in a bath of melted skim milk cheese held at pasteurizing temperature, withdrawing the unit from the bath with a thin adherent layer or coating of pasteurized skim milk cheese and applying to the layer or coating while still viscid a wrapping of metal foil pressed into intimate contact therewith.

4. A unit of raw cheese devoid of rind of selected shape and size with an adherent layer or coating on its exposed surfaces of separately prepared pasteurized skim milk cheese and an external wrapping of metal foil in intimate contact with said layer or coating.

5. A method of preserving a unit of raw cheese devoid of rind, which comprises immersing the unit in a bath of melted pasteurized cheese, withdrawing the unit with a thin adherent layer of the pasteurized cheese and applying around the adherent layer while still viscid a wrapping of substantially impervious material.

6. A method of preparing sectional units of raw cheese which comprises removing the rind from the cheese as manufactured, dividing the cheese into units of desired shape and size, immersing each unit in a bath of pasteurized cheese held at pasteurizing temperature, withdrawing the unit from the bath with a thin adherent layer of pasteurized cheese, and applying around the layer while still viscid a wrapping of substantially impervious material pressed into intimate contact therewith.

HAROLD D. MARSHALL.